US009954738B1

(12) United States Patent
Davis et al.

(10) Patent No.: US 9,954,738 B1
(45) Date of Patent: Apr. 24, 2018

(54) EPHEMERAL PORT REGISTRY/DEVICE DISCOVERY

(71) Applicant: Google LLC, Mountain View, CA (US)

(72) Inventors: Alan Howard Davis, Mountain View, CA (US); Shane R. Nay, San Jose, CA (US)

(73) Assignee: Google LLC, Mountain View, CA (US)

( * ) Notice: Subject to any disclaimer, the term of this patent is extended or adjusted under 35 U.S.C. 154(b) by 412 days.

(21) Appl. No.: 13/796,704

(22) Filed: Mar. 12, 2013

Related U.S. Application Data (60) Provisional application No. 61/715,513, filed on Oct. 18, 2012.

(51) Int. Cl.
*G06F 15/173* (2006.01)
*H04L 12/24* (2006.01)

(52) U.S. Cl.
CPC .................... *H04L 41/12* (2013.01)

(58) Field of Classification Search
CPC ........ H04L 65/102; H04L 41/12; H04L 43/04
USPC ........................................... 709/225
See application file for complete search history.

(56) References Cited

U.S. PATENT DOCUMENTS

| 2002/0188426 | A1* | 12/2002 | Datta | H04L 41/042 |
| | | | | 702/186 |
| 2006/0142005 | A1* | 6/2006 | Takaluoma | G06F 9/542 |
| | | | | 455/435.1 |
| 2007/0061434 | A1* | 3/2007 | Schmieder | H04L 69/32 |
| | | | | 709/223 |
| 2007/0074292 | A1* | 3/2007 | Mimatsu | H04L 63/0428 |
| | | | | 726/26 |
| 2008/0056261 | A1* | 3/2008 | Osborn et al. | 370/392 |
| 2009/0086740 | A1* | 4/2009 | Al-Bakri et al. | 370/401 |
| 2009/0177768 | A1* | 7/2009 | Kind et al. | 709/224 |
| 2011/0299550 | A1* | 12/2011 | Karaoguz et al. | 370/401 |

OTHER PUBLICATIONS

XML-based Mobile Agents (by Steele, Dillon, Pandya and Ventsov) IEEE Computer Society (ITCC'05) p. 3.*

* cited by examiner

*Primary Examiner* — Oleg Survillo
*Assistant Examiner* — Tan Doan
(74) *Attorney, Agent, or Firm* — Lerner, David, Littenberg, Krumholz & Mentlik, LLP (57) ABSTRACT

A system and method is provided where, in one aspect, the system and method provide access to one or more devices located on a server. Each device may be physically connected to a controller. The controller may include a plurality of agents each configured to provide access to a device at a unique ephemeral port. The controller may include a registry that stores mapping information between the agents and the ephemeral ports. Applications running on the controller or running on a client may access the registry for port information of a given agent or a given device via a predetermined port.

18 Claims, 12 Drawing Sheets

| Index | Agent ID | Device ID |
|---|---|---|
| 1 | Agent 1 | Device 1 |
| 2 | Agent 2 | Device 2 |
| 3 | Agent 3 | Device 3 |
| ... | ... | ... |
| N | Agent N | Device N |

| Index | Agent ID | Port No. |
|---|---|---|
| 1 | Agent 2 | 60355 |
| 2 | Agent 3 | 54369 |
| 3 | Agent 1 | 65535 |

| Index | Agent ID | Device ID | Port No. |
|---|---|---|---|
| 1 | Agent 2 | Device 2 | 60355 |
| 2 | Agent 3 | Device 3 | 54369 |
| 3 | Agent 1 | Device 1 | 65535 |

| Index | Agent ID | Port No. |
|---|---|---|
| 1 | Agent 1 | 65535 |
| 5180 | Agent 2 | 60356 |
| 11167 | Agent 3 | 54369 |
| 16031 |  | 49505 |
| 16384 |  | 49152 |

| Agent ID | Agent Type |
|----------|------------|
| Agent 1  | A1         |
| Agent 2  | A2         |
| Agent 3  | A1         |
| ...      | ...        |
| Agent N  | AN         |

| Device ID | Device Type |
|-----------|-------------|
| Device 1  | D1          |
| Device 2  | D1          |
| Device 3  | D2          |
| ...       | ...         |
| Device N  | DN          |

| Index | Agent Type | Device Type |
|-------|------------|-------------|
| 1     | A1         | D1          |
| 2     | A2         | D2          |
| 3     | A3         | D3          |
| ...   | ...        | ...         |
| N     | AN         | DN          |

EPHEMERAL PORT REGISTRY/DEVICE DISCOVERY

CROSS-REFERENCE TO RELATED APPLICATIONS

The present application claims the benefit of the filing date of U.S. Provisional Patent Application No. 61/715,513 filed Oct. 18, 2012, the disclosure of which is hereby incorporated herein by reference.

BACKGROUND

In a server-client environment, a server may provide various services to a client. These services may often require access to hardware of different types of devices connected to the server. Mechanisms to access hardware of each device may vary due to each device type.

SUMMARY

One aspect of the disclosure provides a system. The system includes a controller, which communicates with a plurality of devices. The controller includes a plurality of agents. Each agent is associated with a device, and each agent provides exclusive access to its associated device via a unique ephemeral port. The controller includes a registry, which stores information to access one or more of the devices. The access information includes an allocation of ephemeral ports to the agents that are associated with the devices. The registry is accessible at a predetermined port. An application accesses the registry for information to access one or more of the devices.

The application may send a request to the registry for information to access a device. The registry may determine an ephemeral port allocated to an agent that is associated with the device. The registry may then return the ephemeral port number to the application.

The registry may be dynamically updated to track the allocation of ephemeral ports to different agents. By way of example, the registry may register an agent with its assigned unique ephemeral port, when the associated device is physically connected to the controller. In another example, the registry may deregister the agent with the ephemeral port, when the associated device is physically disconnected from the controller.

Another aspect of the disclosure provides a method for providing access to a plurality of devices. In this aspect, a memory stores information to access the devices. Specifically, the memory includes an allocation of ephemeral ports to agents, where each agent is associated with a device. Each agent provides exclusive access to its associated device via a unique ephemeral port. The method includes receiving a request from an application at a predetermined network port. The application requests for information to access a device. The method determines the ephemeral port allocated to an agent that is associated with the device. Information regarding the ephemeral port is then provided to the application.

BRIEF DESCRIPTION OF THE DRAWINGS

The accompanying drawings, which are incorporated in and constitute a part of this specification, illustrate embodiments of the present disclosure and, together with the detailed description of the embodiments given below, serve to explain the principles of the disclosure.

DETAILED DESCRIPTION

For simplicity and clarity of illustration, like reference numerals may be used in the drawings to identify identical or analogous structural elements. Flowcharts may be used in the drawings to illustrate processes, operations or methods performed by systems, apparatuses or devices disclosed herein. The flowcharts are mere exemplary illustrations of steps performed in individual process, operation or method. Steps may not be performed in the precise order as illustrated or described. Rather, various steps may be handled simultaneously or performed in sequences different from that illustrated or described. Steps may also be omitted from or added to the flowcharts unless otherwise stated.

Figure 1:
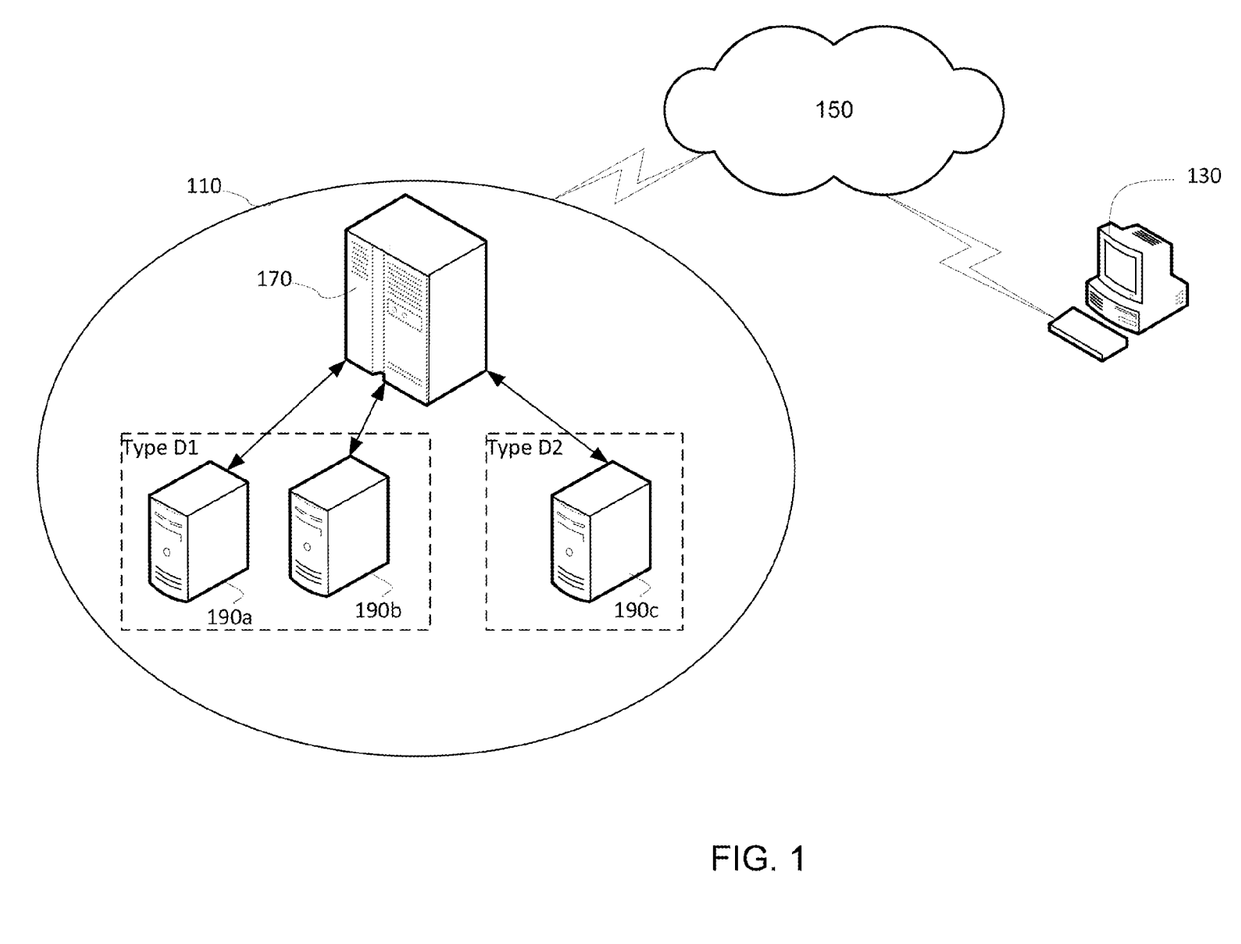
FIG. 1 is a block diagram of a network that connects a server and a client.

FIG. 1 illustrates a server 110, a client 130, and a network 150 that facilitates direct or indirect communication between the server 110 and the client 130 . The server may represent a data center that provides services to one or more clients 130. Although FIG. 1 illustrates only one server 110, more than one server 110 may be included, and the servers 110 may work independently from or collaboratively with each other.

The network 150 may be a local area network (LAN) or a wide area network (WAN). The server 110 and the client 130 each may be a node of the network 150. Each node may be identified by a unique network address, which may be a unique internal network address, or an Internet Protocol (IP) address.

With continued reference to FIG. 1, the server 110 may include a controller 170 that communicates with one or more electronic devices 190a-c connected thereto. The controller 170 may be a machine with computing algorithms implemented therein. The computing algorithms are executable by processor 172. The controller 170 may be coupled to devices 190a-c of different device types that range from simple implementation to complex implementation. For instance, the devices 190a-c may be different types of computer peripherals, including but not limited to keyboards, point devices, digital cameras, printers, disk drives, network adapters and other similar devices. As illustrated in FIG. 1, Devices 190*a-b* may be a different type of device than device 190*c*. For instance, devices 190*a-b* may be of type D1, whereas device 190*c* may be of type D2. Each type may include one or more devices 190*a-c*.

The controller 170 and the devices 190*a-c* may be electrically and/or mechanically coupled to each other via cables, connectors or communications protocols. Each of the devices 190*a-c* may interface with the controller 170 via one or more of a Universal Serial Bus (USB) port, serial port, parallel port, System Management Bus (SMBus), and other means.

The controller 170 may control hardware of one or more devices 190*a-c*. For instance, the controller 170 may monitor the power setting of each device, and may issue instructions to one or more hardware components of each device to adjust the power setting. The hardware components may include but not limited to a power switch, power button, and light indicator, e.g., LED.

In one aspect, one or more of the devices 190*a-c* may provide one or more services to one or more applications running on the controller 170. In another aspect, one or more of the devices 190*a-c* may provide one or more services to one or more applications running on the client 130 via a network communication between the controller 170 and the client 130.

There may be many different arrangements of the controller 170 and the devices 190*a-c* in the server 110 environment. For instance, the devices 190*a-c* may be mounted on one rack, and the controller 170 may or may not be mounted on the same rack as the devices 190*a-c*. Alternatively, the devices 190*a-c* may be mounted on different racks, and the controller 170 may be mounted on one of the racks as the devices 190*a-c* or on a different rack.

Figure 2:
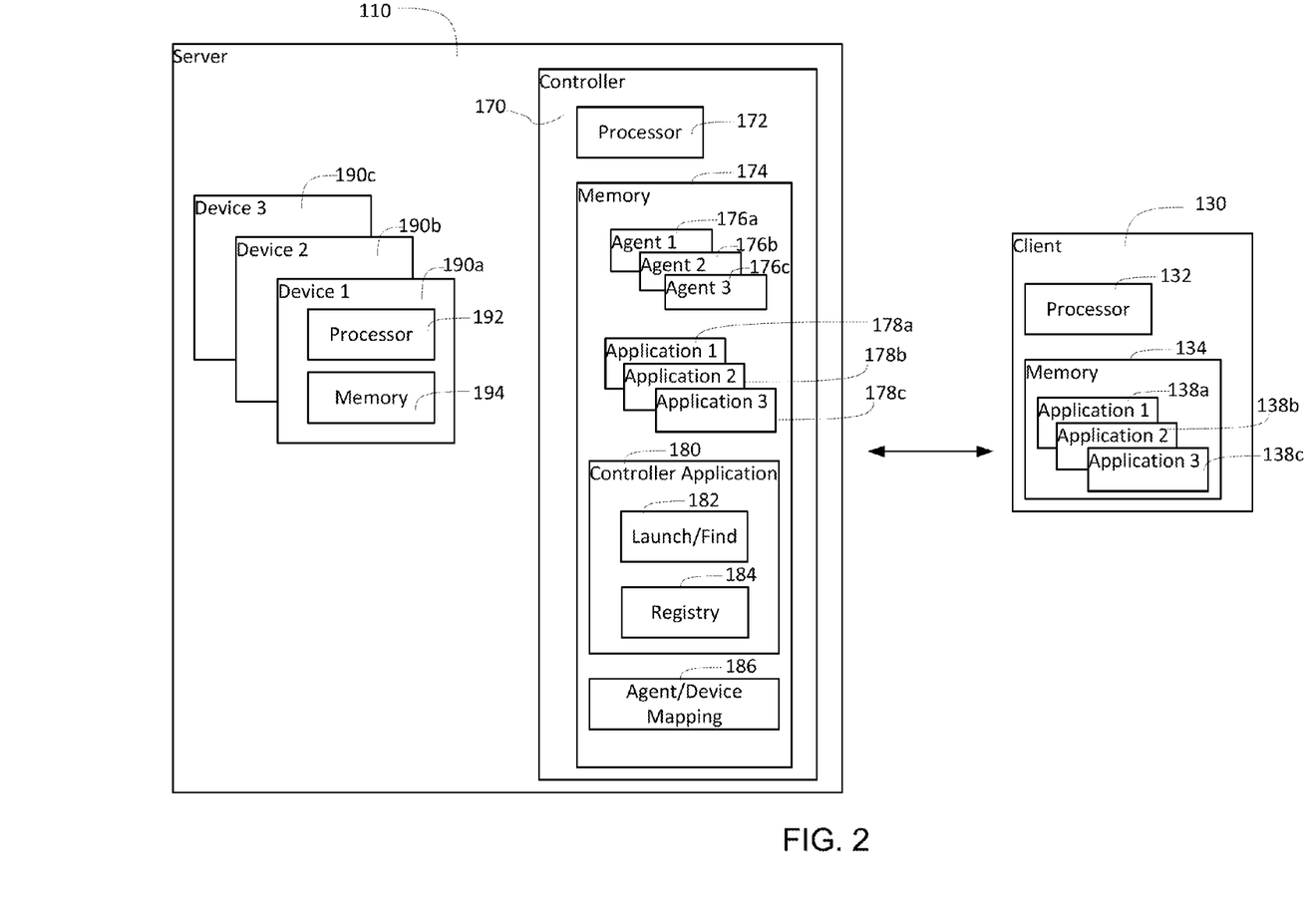
FIG. 2 is block diagram of configurations of the server and the client.

FIG. 2 illustrates configurations of the controller 170, client 130 and devices 190*a-c* in some aspects. Each of them may include a processor and a memory therein.

The memory may include volatile memory such as dynamic random access memory (DRAM) or static random access memory (SRAM), or any other forms of alterable memory that may be electrically erased and reprogrammed to allow updates. The memory may also include non-volatile memory, such as a programmable logical array, a ROM, or other forms of non-alterable memory which cannot be modified, or can be modified only slowly or with difficulty. For instance, the non-volatile memory may comprise read only memory storage which is programmed only during fabrication.

The controller 170 and the client 130 each may include one or more applications, e.g., applications 178*a-c* and 138*a-c*, in their respective memories 174, 134. Each application may be a program or a set of instructions that define logic executable on a device, e.g., device 190*a*. In one aspect, an application may define low-level operations of a device. Each application may define executable instructions specific to a device. Each application may include a plurality of routines, procedures, or functions directed to a specific device. For instance, an application, e.g., application 178*a* or 138*a*, may define low-level operations of a device that may affect one or more hardware components of the device. The operations may include one or more of the following: power supply management, power consumption management, battery supply management, light control, button control, sound generation, and other similar operations.

The applications 178*a-c* on the controller 170 and the applications 138*a-c* on the client 130 may interact with each other via the Transmission Control Protocol and Internet Protocol (TCP/IP). An application, e.g., application 178*a*, on the controller 170 may communicate with an application 138*a* on the client 130 via the TCP/IP protocol. Similarly, applications 178*a-c* on the controller 170 may communicate with each other via the TCP/IP protocol. In one example, any one of the applications 178*a-c* and 138*a-c* may invoke subroutine or procedure of another application via a remote procedure call (RPC).

As shown in FIG. 2, the controller 170 may include a plurality of agents 176*a-c* each uniquely associated with one of the devices 190*a-c*. Each agent serves as an exclusive communication point between its associated device and an application, e.g., application 178*a* or 138*a*. Each agent may serve as a proxy for its associated device. More particularly, in one aspect each agent may be configured to regulate any transmission to or from its associated device.

Figure 3:
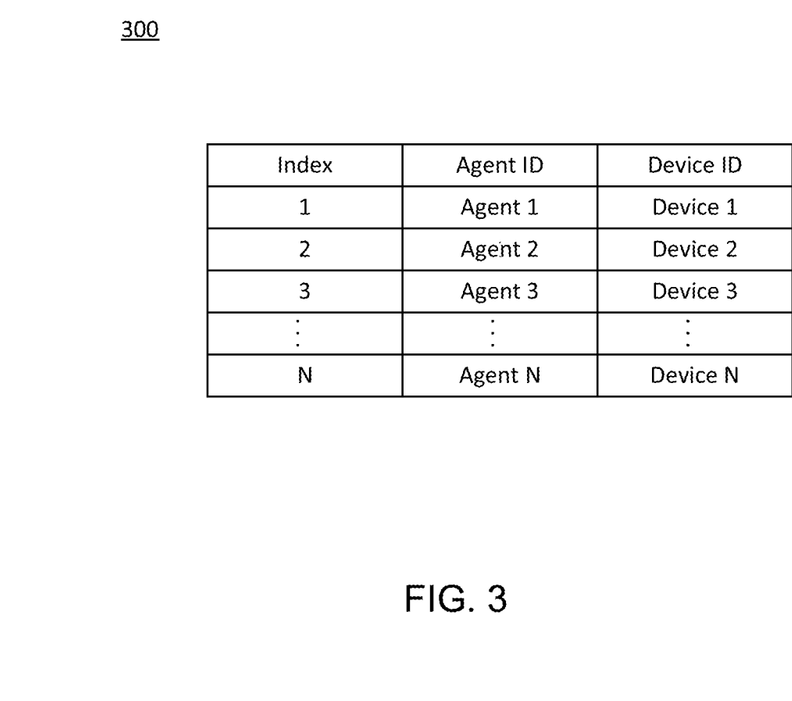
FIG. 3 is a table illustrating agent/device mapping information.

The controller 170 may include agent/device mapping information 186 in its memory 174. The mapping information 186 may identify one-on-one mappings between the agents 176*a-c* and the devices 190*a-c*. The mapping information 186 may have an index scheme illustrated in FIG. 3. As illustrated in FIG. 3, the mapping information 300 may be indexed such that each index refers to a unique pair of an agent and its associated device. Each agent may be identified by an Agent ID, which may be a string or integer uniquely identifying the agent. The Agent ID may include the agent name. Similarly, each device may be identified by a Device ID, which may be a string or integer uniquely identifying the device. In one embodiment, the agent/device mapping information 186 may be maintained by a registry 184.

Figure 4:
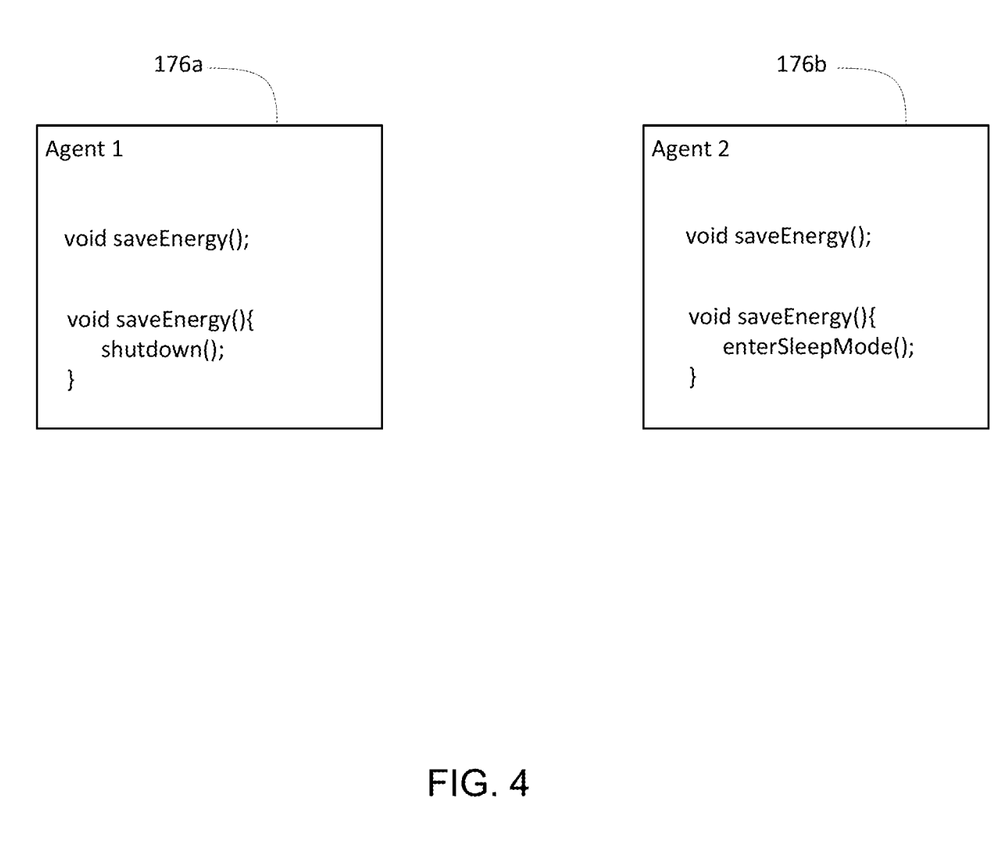
FIG. 4 is a block diagram illustrating agents with a common interface, but different implementations.

In one embodiment, two or more agents, e.g., agents 176*a-c*, may share a common interface which declares a set of operations, but with different implementations. As illustrated in FIG. 4, each agent, e.g., agents 176*a-b*, may define a saveEnergy( )operation that reduces power consumption of its associated device, e.g., devices 190*a-b*. However, the saveEnergy( )operations as implemented by each agent may have different algorithms. For instance, the saveEnergy( )operation of Agent 1, also identified as agent 176*a*, may include instructions to shut down its associated device 190*a*, whereas the saveEnergy( )operation of Agent 2, also identified as agent 176*b*, may include instructions to switch its associated device 190*b* into a sleep mode without a complete shutdown.

Each agent 176*a-c* acquires a unique network port from the operating system of the controller 170. A port may be an application-specific or process-specific software construct serving as a communications endpoint on the controller 170. Each port may be identified by a unique 16-bit port number, e.g., in the range from 0 to 65535. The controller 170 may have a reserved pool of port numbers, e.g., 49152-65535, any one of which may be arbitrarily assigned, if available, to an agent in a random manner upon the agent's request. Each port number arbitrarily assigned in this manner is an ephemeral port. The assignment of each ephemeral port to an agent may be temporary and only valid for the duration that the associated device is physically connected to the controller 170. Once the device is physically disconnected from the controller 170, the ephemeral port may be relinquished and become available for reuse.

To avoid port conflicts, the controller 170 or the operating system of the controller 170 may assign a port number exclusively to one agent at a time, such that each agent is associated with a unique port number. Once an agent acquires a port arbitrarily assigned by the controller, the agent may bind itself to the port, and respond to any transmissions received at the port. As such, each agent may regulate any transmission to or from its associated device via the port.

Figure 5:
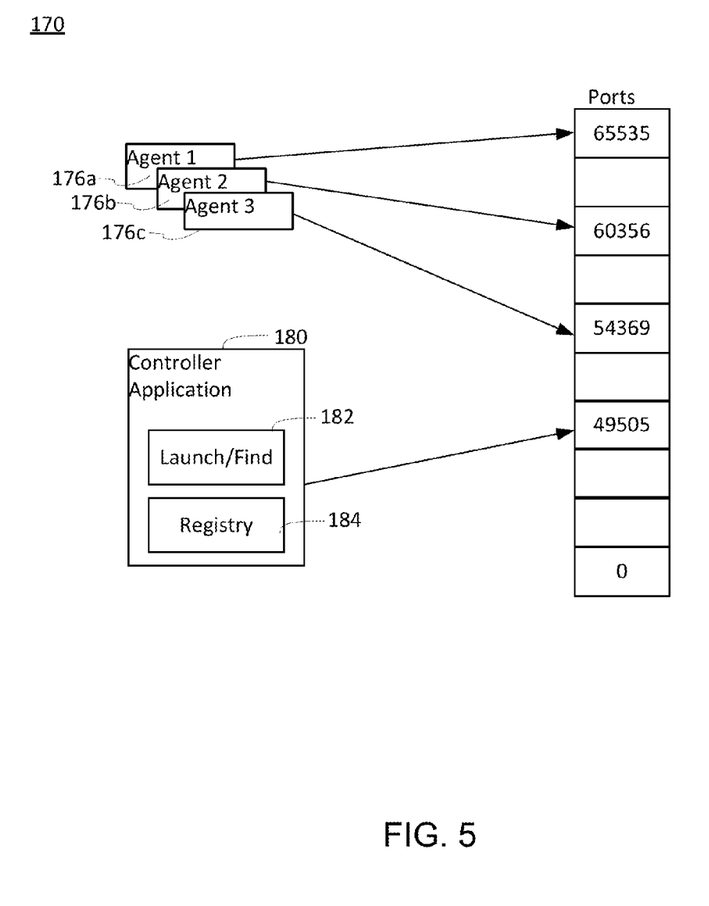
FIG. 5 is a block diagram illustrating port assignments to agents and a controller application.

In FIG. 5, each agent is bound to a unique ephemeral port. For instance, agents 176a, 176b and 176c are associated with ports 65535, 60356 and 54369, respectively. As a result, multiple agents 176a-c that run concurrently on the controller 170 may maintain simultaneous connections with their respective devices 190a-c via the unique ports.

Referring back to FIG. 2, the controller 170 may keep track of the allocation of the ephemeral ports to the agents. The controller 170 may include a controller application 180 in its memory 174. In one aspect, processor 172 is configured to execute the controller application 180. The controller application 180 may be different from applications 178a-c, 138a-c that run on the controller 180 and the client 130. The controller application 180 may facilitate communications between the applications 178a-c, 138a-c and the devices 190a-c, or more specifically, facilitate communications between the applications 178a-c, 138a-c and the agents 176a-c.

Figures 6, 6A, 6B:
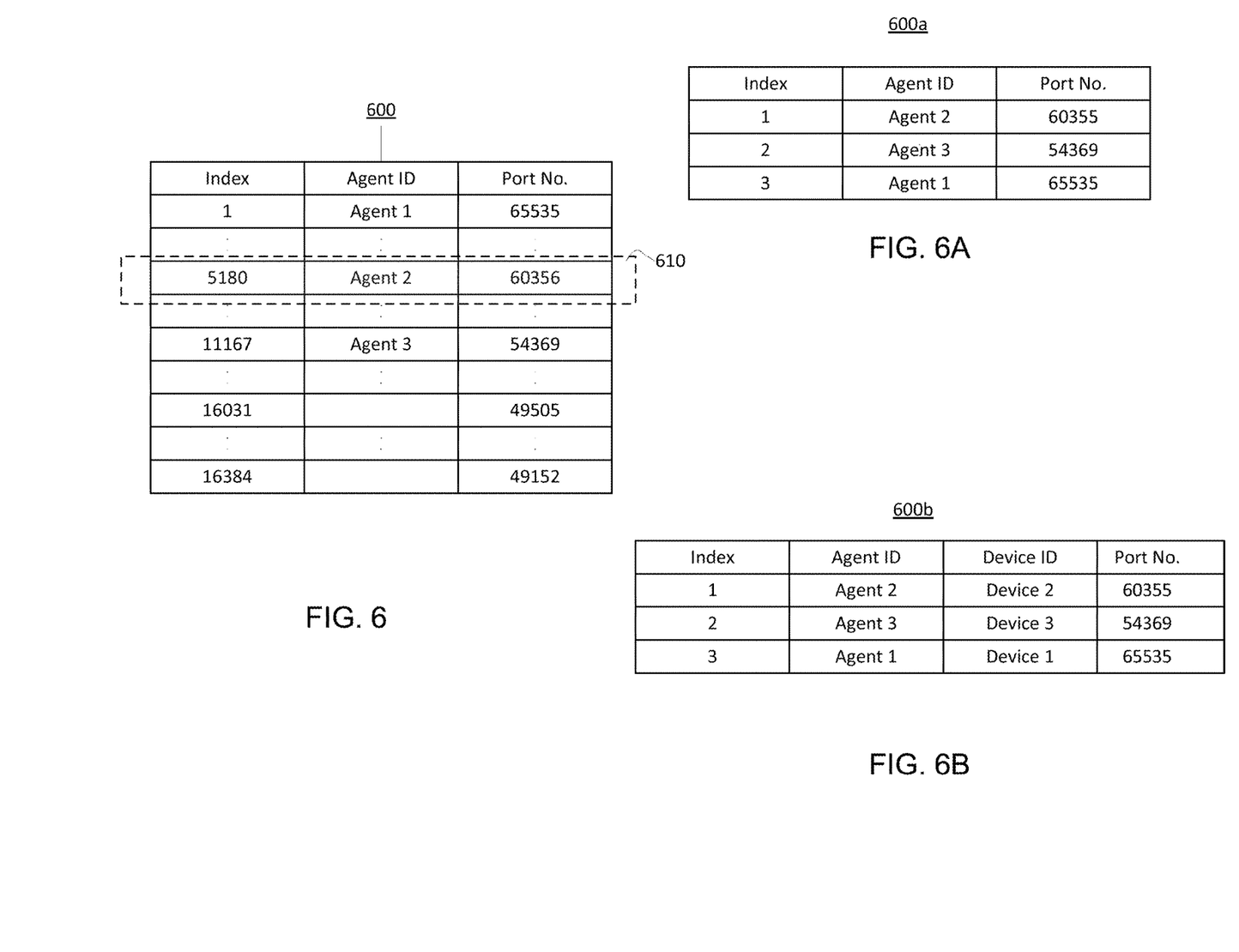
FIGS. 6, 6A and 6B are tables illustrating different embodiments of a registry.

The controller application 180 may include a registry 184 to store information related to the allocation of the ephemeral ports to the agents. The registry 184 may be one logical repository, e.g., a relational database or a hierarchical database. Various embodiments of the registry 184 illustrated in FIGS. 6-6B are discussed below. Each embodiment describes the allocation of the ephemeral ports illustrated in FIG. 5.

In one embodiment, the registry 184 may keep track of the allocation of all ephemeral ports in the reserved pool as shown in FIG. 6, regardless of whether they are assigned to the agents. The processor 172 may be configured to manage operation of the registry 184. Table 600 of FIG. 6 provides one example of the information maintained in the registry 184. The table 600 may include a plurality of entries/rows 610 each designated for a unique ephemeral port. Each entry 610 may contain one or more of the following elements: index, Agent ID and ephemeral port number. The index may be an integer that uniquely identifies each entry/row 610. As previously discussed, the Agent ID may be a string or integer uniquely identifying an agent. The ephemeral port number may be the address of the port assigned to the agent identified by the Agent Id. Optionally, the table 600 may include a Device ID column, such that the table 600 may include agent/device mapping information that pairs each agent with a unique device. Since each agent is uniquely bound to one port, and each agent is uniquely associated with one device, each device is uniquely associated with one port.

Alternatively, the registry 184 may only keep track of the ephemeral ports assigned to the agents, as shown in FIG. 6A.

In another embodiment, as shown in FIG. 6B, the registry 184 may include a Device ID field in addition to or in substitution of the Agent ID field.

The registry 184 may be updated from time to time to reflect the current port allocation status. For instance, when the controller 170 or its operating system assigns an ephemeral port to an agent upon the agent's request, the registry 184 may dynamically update its entries 610 to reflect the new assignment. Conversely, once an agent is dissociated with its acquired port, the registry 184 may update its entries accordingly. The registry 184 or the controller application 180 maybe assigned to a predetermined, fixed port, e.g., 49505, as shown in FIG. 5, such that the registry 184 or the controller application 180 may be accessed via the fixed port.

The fixed port of the registry 184 may be known to one or more of the agents 176a-c. Each agent may have prior knowledge of the fixed port to access the registry 184. Each agent, e.g., 176a-c, may register or deregister itself with the registry 184 via the fixed port. Once an agent acquires a port number upon its request to the operating system, the agent may register itself with the registry 184. Similarly, when an agent is dissociated with its acquired port number, which may take place when the device associated with the agent is physically disconnected from the controller 170, the agent may deregister itself from the registry 184. The registry 184 may dynamically update its corresponding entries upon registration and deregistration requests.

Figure 7:
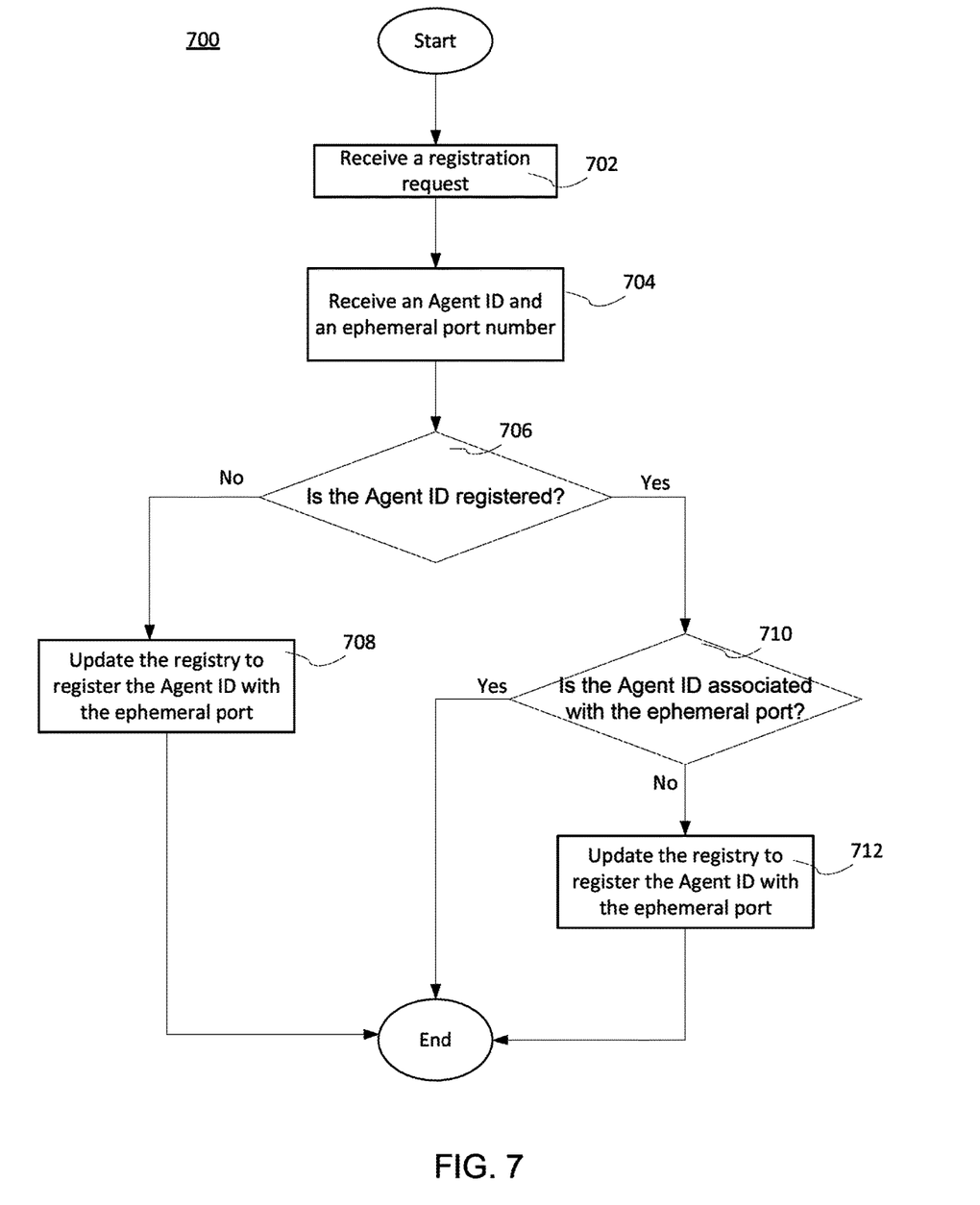
FIG. 7 is a flow diagram of a process by the registry to register an agent.

FIG. 7 is a flowchart illustrating a method performed by the registry 184 to register an agent. At block 702, the registry 184 may receive a registration request initiated by an agent, e.g., agent 176a, at the fixed port of the registry 184. At block 704, the registry 184 may receive information provided by the agent that identifies the agent or its associated device. The identification information may include one or more of the Agent ID and the Device ID. The registry 184 may also receive the ephemeral port number that the agent acquires from the operating system of the controller 170. At block 706, the registry 184 may determine if the agent has already been registered. For example, the registry 184 may look up for any entry related to the Agent ID or the Device ID. If no entry is found, the registry 184 may, at block 708, create an entry that registers the Agent ID with the ephemeral port number. If an entry is found, the registry 184 may at block 710 determine if the ephemeral port number received at block 702 is already identified or associated with the Agent ID in the entry. If false, the registry 184 may update the entry to register the Agent ID with the ephemeral port received at block 704.

Figure 8:
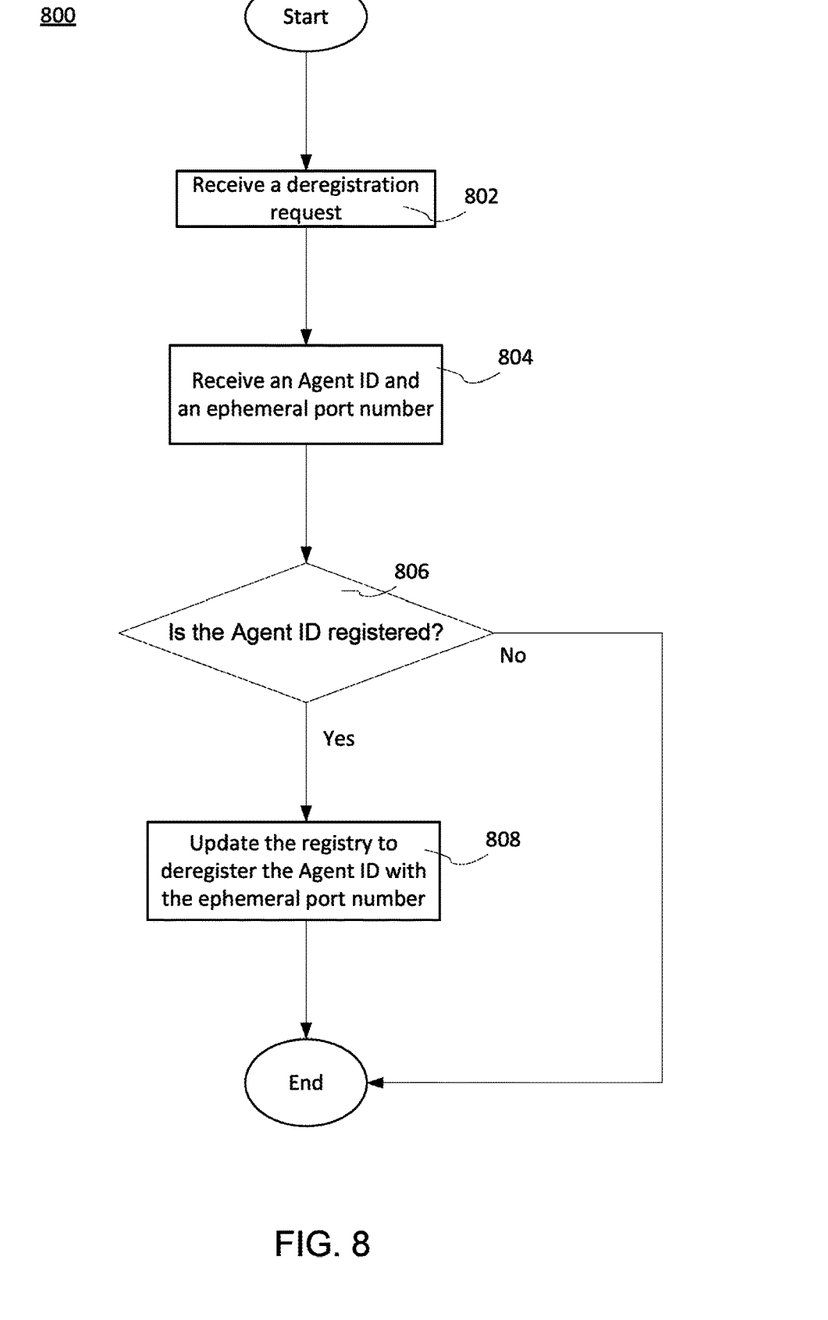
FIG. 8 is a flow diagram of a process by the registry to deregister an agent.

FIG. 8 is a flowchart illustrating a method performed by the registry 184 to deregister an agent. At block 802, the registry 184 may receive a deregistration request initiated by an agent, e.g., 176a, at the fixed port of the registry 184. At block 804, the registry 184 may receive information provided by the agent that identifies the agent or its associated device. The identification information may include one or more of the Agent ID and the Device ID. The registry 184 may also receive the number of the ephemeral port that the agent deregisters with. At block 806, the registry 184 may determine if the agent is registered. The registry 184 may look up for any entry related to the Agent ID or the Device ID. If no entry is found, no action is required. Otherwise, the registry 184 may at block 808 remove the entry or update the entry to deregister the Agent ID with the ephemeral port received at block 804.

Alternatively, to deregister an agent, the controller 170 may periodically query each agent registered in the registry 184 to determine if the agent is still running or to determine a healthy state of the agent. A healthy state of an agent may depend in part on one or more of the following: memory usage, CPU usage, performance, virus infection and others. The healthy state of the agent may indicate if the agent is running properly, or if any issue exists in the agent that prevents it from running properly. If the controller 170 detects that the agent has stopped running or if the healthy state of the agent indicates that the agent is not running properly or an issue exists in the agent, the registry 184 may deregister the agent with its associated ephemeral port as discussed above regarding block 808. Once an agent is deregistered from the registry 184, if the device associated with that agent remains connected to the controller 170, the module 182 may launch a new agent for that device.

In some aspects, each application, e.g., applications 178*a-c* and 138*a-c*, whether on the controller 170 or on the client 130, may know in advance the fixed port number of the registry 184, such that the registry 184 may be readily accessible to each application via the fixed port number. An application, e.g., application 178*a* or 138*a*, may not have prior knowledge of the ephemeral port number designated for a specific agent or a specific device interested by the application. The application may access the registry 184 via the fixed port to locate an ephemeral port number designated for the specific agent or the specific device.

Figure 9:
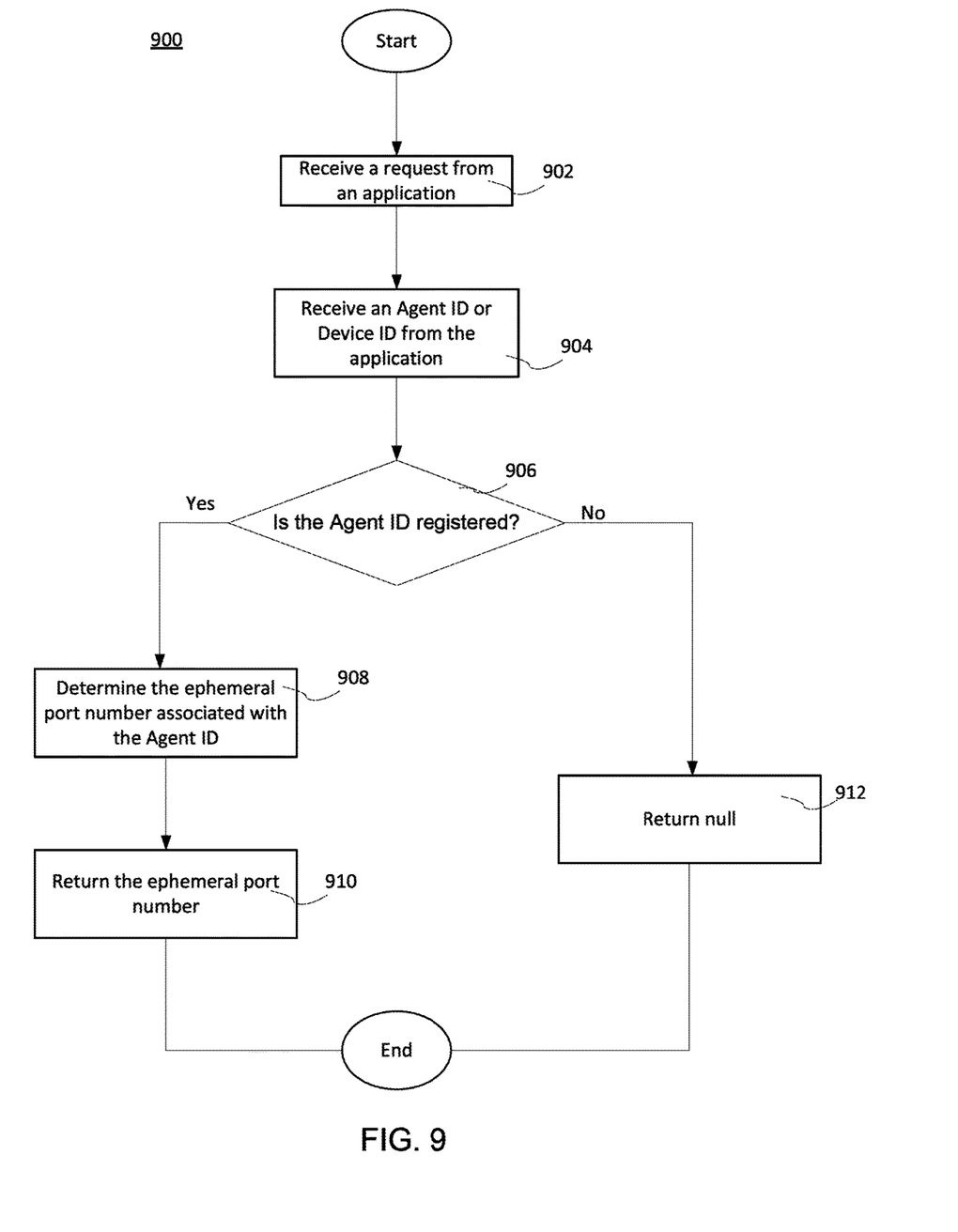
FIG. 9 is a flow diagram of a process by the registry to look up an ephemeral port number for a given agent or a given device.

FIG. 9 is a flowchart illustrating a method performed by the registry 184 to locate an ephemeral port number upon a request made by an application, e.g., application 178*a* or 138*a*. At block 902, the registry 184 may receive a request from an application, e.g., application 178*a* or 138*a*, to determine an ephemeral port number associated with a specific device, or an agent associated with the specific device. At block 904, the registry 184 may receive a Device ID identifying the specific device, or may receive an Agent ID identifying the agent associated with the specific device. At block 906, the registry 184 may look up its record to determine if the Agent ID or Device ID received at block 904 is registered. If false, the registry 184 may return null to the application. If true, at block 908, the registry 184 may determine the ephemeral port number associated with the Agent ID or the Device ID. At block 910, the registry 184 may return the determined ephemeral port number to the application.

Once the application, e.g., application 178*a* or 138*a*, learns the ephemeral port number from the registry 184, the application may communicate with the device, e.g., device 190*a*, via the ephemeral port number identified by the registry 184. For instance, the application may transmit information or data packets to the ephemeral port number. The agent at the ephemeral port number may process the transmission, and may communicate it to the associated device, e.g., device 190*a*.

Referring back to FIG. 2, the controller 170 may include a launch/find module 182 to monitor the current status of devices connected to the controller 170. For instance, the launch/find module 182 may monitor the devices that are currently connected to the controller 170, and may detect any device newly connected to or disconnected from the controller 170.

Similar to the registry 184, the launch/find module 182 may be accessible at a fixed port, as illustrated in FIG. 5. The fixed port for the launch/find module 182 may be identical to or different from the fixed port designated for the registry 184.

When a device is initially connected to the controller 170, the device may provide device identification information, e.g., Device ID, to the launch/find module 182. The device may communicate the identification information to the launch/find module 182 via the fixed port of the launch/find module, which may be known to the device in advance. The launch/find module 182 may query the agent/device mapping information 186 for an agent associated with the device identified by the Device ID. After identifying the agent, the launch/find module 182 may launch the agent. Once launched, the agent may request a unique network port from the operating system of the controller 170, and may register itself with the registry 184 as described earlier with respect to FIG. 7.

Figure 10:
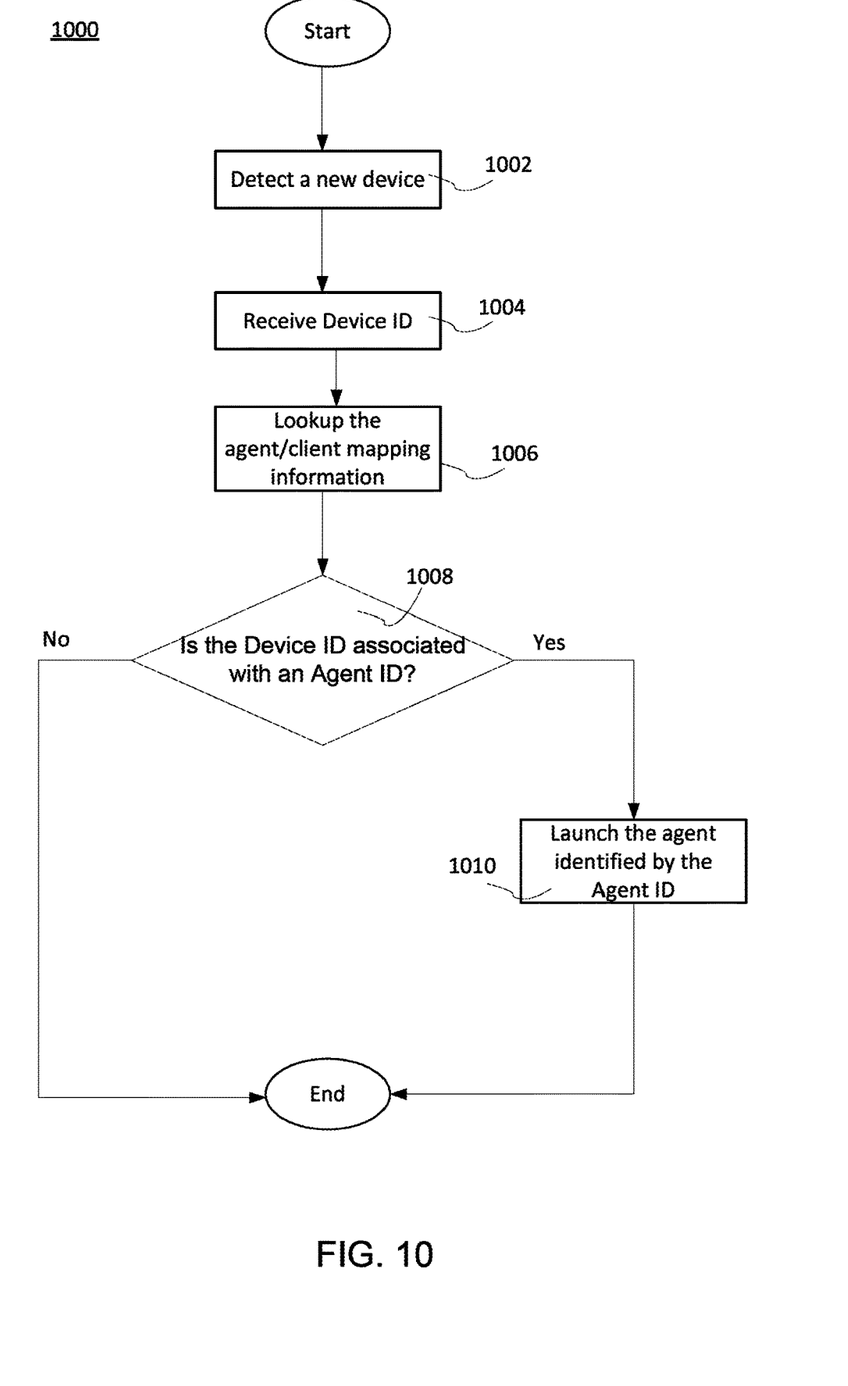
FIG. 10 is a flow diagram of a process by a launch/find module after detecting a device.

FIG. 10 is a flowchart illustrating a method performed by the launch/find module 182. At block 1002, the module 182 may detect a device newly connected to the controller 170. The module 182 may actively scan from time to time to detect any device newly connected to the controller 170. The module 182 may perform the scan either periodically, e.g., once per hour, or in real or quasi-real time.

If a new device is detected, at block 1004, the module 182 may receive identification information, e.g., Device ID, from the device at the fixed port of the module 182. As described earlier, the Device ID may be a string or integer uniquely identifying a device, which may be the device name. Thereafter, at block 1006, the module 182 may look up the agent/device mapping information. The agent/device mapping information may be stored in the table 300 of FIG. 3. Alternatively, the agent/device mapping information may be stored in the table 600 of FIG. 6.

At block 1008, the module 182 may determine if there is an agent associated with the Device ID discerned at block 1004. For instance, the module 182 may query the agent/device mapping information to determine if there is an agent associated with the Device ID. If false, no action is required. If true, the module 182 may proceed to block 1010 to launch the identified agent.

Figure 11:
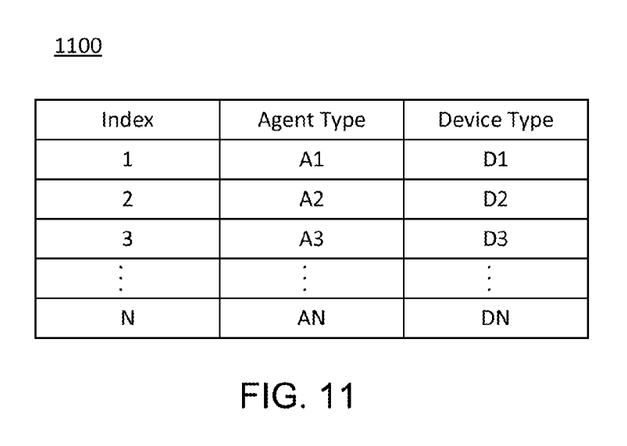
FIG. 11 is a table illustrating a mapping between agent types and device types.
Figure 12:
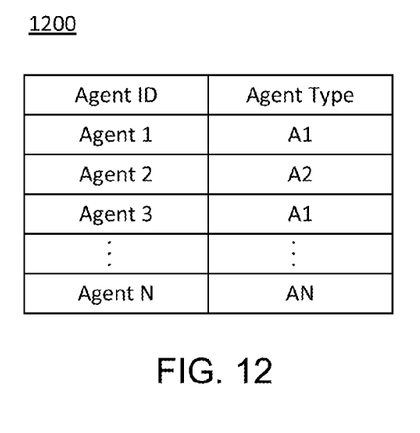
FIG. 12 is a table illustrating agents defined by agent types.
Figure 13:
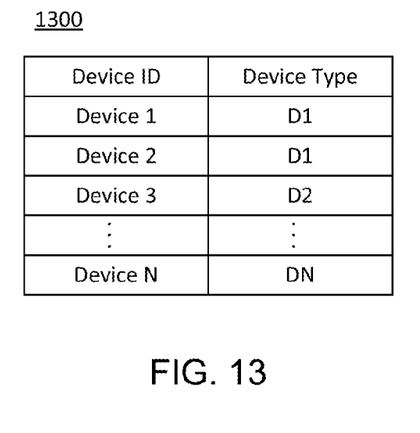
FIG. 13 is a table illustrating devices defined by device types.

In some embodiments, the module 182 may include a static table 1100 of FIG. 11 that includes mapping information between agent types and device types. Each agent may be associated with an agent type as illustrated in FIG. 12. Different agents, e.g., Agents 1 and 3, may share the same agent type, e.g., A1. Similarly, each device may also be associated with a device type as shown in FIG. 13. Different devices, e.g., Devices 1 and 2, may share the same device type, e.g., D1.

The mapping shown in FIGS. 11-13 may together indicate compatibilities or associations among various agents and devices based on their types. For instance, according to FIGS. 11-13, each of the Devices 1 and 2 of device type D1 is compatible or associated with Agents 1 and 3 of agent type A1. As a result, if any one of the Devices 1 and 2 is detected, the module 182 may select one of the agents, e.g., Agents 1 and 3, that are compatible with the detected device.

Figure 14:
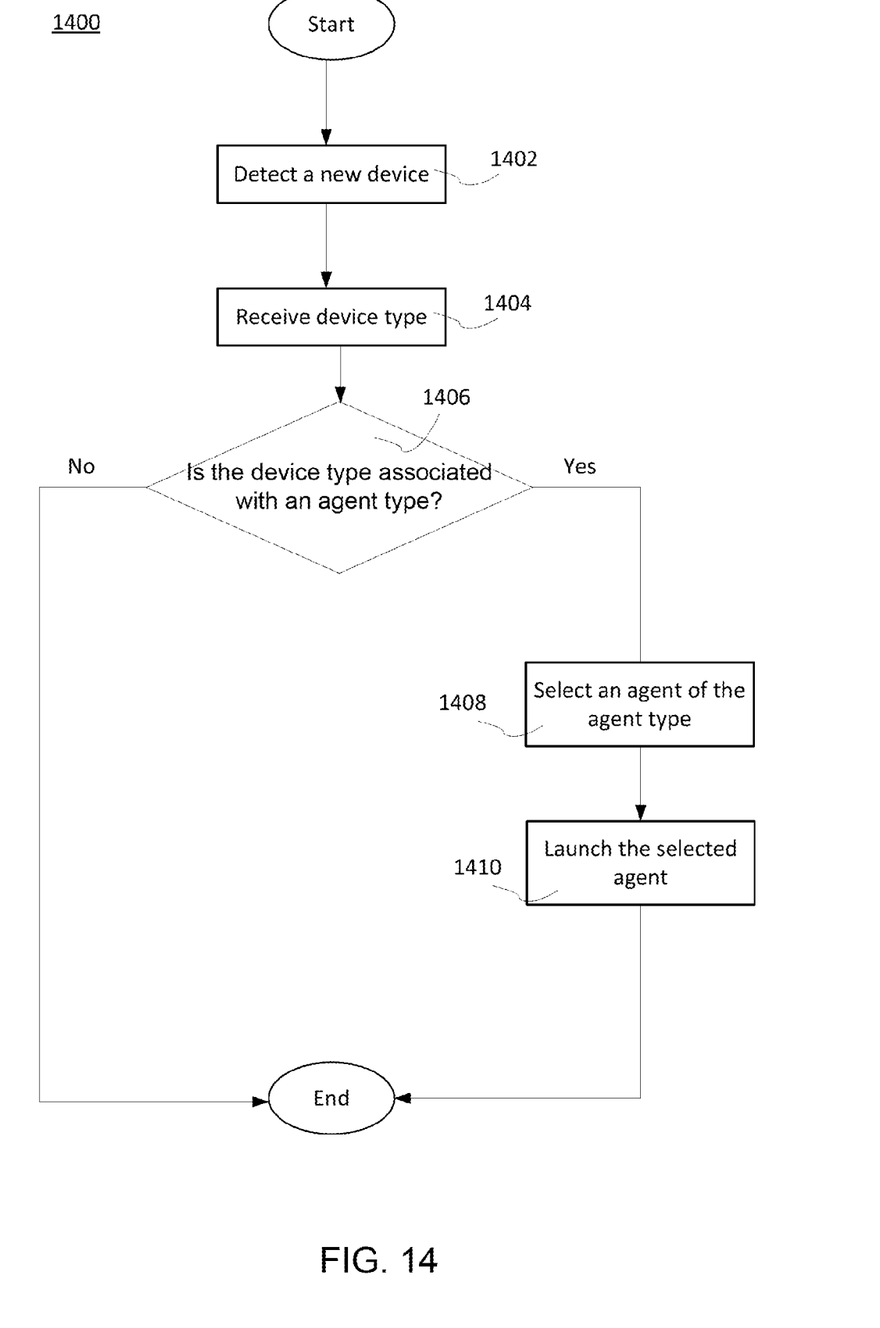
FIG. 14 is a flow diagram of an alternate embodiment of a process by a launch/find module after detecting a device.

FIG. 14 is a flowchart illustrating an alternate method performed by the launch/find module 182 upon detecting a device. Block 1402 is similar or identical to block 1002 of FIG. 10 in that the module 182 may detect a device newly connected to the controller 170. Next, at block 1404, the module 182 may receive identification information, e.g., Device ID and device type, from the device at the fixed port of the module 182. Thereafter, at block 1406, the module 182 may determine if an agent type is associated or compatible with the device type based on the table 1100 of FIG. 11. If false, no action is required. If true, at block 1408, the module 182 may select an agent of the agent type determined in block 1404, based on the table 1200 of FIG. 12. When multiple agents are associated or compatible with the device, the module 182 may randomly select one of the compatible agents. At block 1410, the module 182 launches the selected agent.

When the selected agent fails to launch properly or stops running after launch, or if any issue occurs in the selected agent, the module 182 may determine if any remaining agents are compatible with the device. If true, the module 182 may select and launch one of the remaining compatible agents.

In some aspects, each device, e.g., device 190*a*, is passive in nature, and does not initiate communications with any applications running on the controller 170 or the client 130.

Each device, e.g., device 190*a*, may not send any data packets to the controller 170 or the client 130 until receiving communications or inbound data packets 1002 from an application, e.g., application 178*a* or 138*a*.

In one aspect, the implementation of the controller 170 discussed above generalizes, simplifies and standardizes communication mechanisms used to access devices, or their hardware, on the server 110. The controller 170 provides a standard approach to applications external to the devices, e.g., applications 178*a-c* and 138*a-c*, to gain access to the devices 190*a-c*. All applications may simply provide identification information of an agent or a device to a pre-determined, fixed network port known in advance to the applications, and may access devices of different types using the same approach. As a result, a large number of applications, which are services supported by the devices, can be executed using just one pre-determined network port.

As these and other variations and combinations of the features discussed above can be utilized without departing from the systems and methods as defined by the claims, the foregoing description of exemplary embodiments should be taken by way of illustration rather than by way of limitation of the disclosure as defined by the claims. Further, the provision of examples (as well as clauses phrased as "such as," "e.g.", "including" and the like) should not be interpreted as limiting the disclosure to the specific examples; rather, the examples are intended to illustrate only some of many possible aspects.

The invention claimed is:

1. A method for providing access to a plurality of devices, comprising:
   detecting, by one or more processors of a controller, a presence of one of the plurality of devices;
   selecting, by the one or more processors of the controller, an agent, from a plurality of agents, compatible with the detected device;
   receiving, by the selected agent, an assignment of a unique ephemeral port from the controller;
   registering, by the selected agent, the selected agent in a registry in response to receiving the unique ephemeral port from a controller, the registering being performed using a predetermined network port known to the agents prior to receiving the unique ephemeral port;
   storing, in a memory, the registry, the registry including an allocation of ephemeral ports to the plurality of agents, each agent being associated with one of a plurality of devices;
   providing, by the selected agent, exclusive access to its associated device via the unique ephemeral port;
   receiving at the predetermined network port a request from at least one of a controller application or a client application for information to access one of the plurality of devices, the at least one of the controller application or the client application having preexisting knowledge of the predetermined port;
   determining, with the one or more processors, which ephemeral port is allocated to a given one of the plurality of agents associated with the device requested by the application;
   providing information of the determined ephemeral port to the application;
   launching the selected agent;
   defining, by the selected agent, a first operation; and
   defining, by a second agent, a second operation, wherein the first operation and the second operation have different algorithms.

2. The method of claim 1, further comprising updating the stored information to register one given agent with an associated ephemeral port.

3. The method of claim 1, further comprising updating the stored information to deregister one given agent with an associated ephemeral port.

4. The method of claim 1, further comprising dynamically updating the stored information to track the allocation of ephemeral ports to the plurality of agents.

5. A system, comprising:
   a controller configured to communicate with a plurality of devices, the controller including:
   one or more processors;
   a plurality of agents in communication with the one or more processors, each agent being associated with one of the plurality of devices, wherein each of the plurality of agents defines an operation, and wherein the operations implemented by each agent have different algorithms; and
   a registry configured to store information to access the plurality of devices, the access information including an assignment of ephemeral ports to the agents associated with the devices, the registry being accessible at a predetermined port by at least one of a controller application or a client application for information to access one of the plurality of devices, the at least one of the controller application or the client application having preexisting knowledge of the predetermined port,
   wherein the controller is configured to:
   detect a connection of one of the plurality of devices to the controller;
   select an agent from the plurality of agents compatible with the detected device; and
   launch the selected agent; and
   wherein each agent, having knowledge of the predetermined port, is configured to:
   receive an assignment of a unique ephemeral port from the controller;
   register itself, using the predetermined port, in the registry in response to receiving the unique ephemeral port from the controller; and
   provide exclusive access to its associated device via the assigned unique ephemeral port.

6. The system of claim 5, wherein the registry is configured to:
   receive, through the predetermined port, a request from the application for information to access a given one of the plurality of devices;
   determine one ephemeral port allocated to a given one of the plurality of agents associated with the given device; and
   return information of the determined ephemeral port to the application.

7. The system of claim 6, wherein the request includes information identifying a particular device or a particular agent.

8. The system of claim 5, wherein the registry is dynamically updated to track the allocation of ephemeral ports to the agents.

9. The system of claim 5, wherein the application includes a set of instructions executable by one of the plurality of devices.

10. The system of claim 5, wherein a given agent is temporarily assigned to a unique ephemeral port for a specified period of time when its associated device is physically connected to the controller.

11. The system of claim 10, wherein the registry is configured to register the given agent with its assigned unique ephemeral port.

12. The system of claim 5, wherein a given agent is disassociated from its unique ephemeral port when its associated device is physically disconnected from the controller.

13. The system of claim 12, wherein the registry is configured to deregister the given agent with its disassociated ephemeral port.

14. The system of claim 5, wherein each agent is configured to process transmissions between its associated device and an application external to the device via its associated unique ephemeral port.

15. The system of claim 5, wherein the plurality of devices are of different device types.

16. The system of claim 5, wherein each device is physically connected to the controller via one or more of a Universal Serial Bus (USB) port, a serial port, a parallel port, and a System Management Bus (SMBus).

17. The system of claim 5, wherein at least two agents run concurrently, and each of the at least two agents maintains a connection with its associated device via its associated unique ephemeral port.

18. The system of claim 5, wherein two or more of the plurality of agents share a common interface which declares a set of operations with different implementations.

* * * * *